(12) United States Patent
Bieler et al.

(10) Patent No.: US 7,443,128 B2
(45) Date of Patent: Oct. 28, 2008

(54) METHOD AND DEVICE FOR CONTROLLING MOTORS

(75) Inventors: Thierry Bieler, Morges (CH); Laurent Cardoletti, Villeneuve (CH); Christian Fleury, Bellerive (CH); Christian Koechli, Yvonand (CH)

(73) Assignee: Micro-Beam S.A., Neuchatel (CH)

( * ) Notice: Subject to any disclaimer, the term of this patent is extended or adjusted under 35 U.S.C. 154(b) by 130 days.

(21) Appl. No.: 10/588,541

(22) PCT Filed: Feb. 4, 2005

(86) PCT No.: PCT/CH2005/000064

§ 371 (c)(1),
(2), (4) Date: Aug. 7, 2006

(87) PCT Pub. No.: WO2005/076458

PCT Pub. Date: Aug. 18, 2005

(65) Prior Publication Data

US 2007/0164698 A1    Jul. 19, 2007

Related U.S. Application Data

(60) Provisional application No. 60/542,349, filed on Feb. 6, 2004.

(51) Int. Cl.
*H02P 1/46* (2006.01)
(52) U.S. Cl. .................. 318/723; 318/716; 318/727; 318/801
(58) Field of Classification Search ............ 318/723, 318/716, 727, 801, 806, 811, 701, 798, 767, 318/817
See application file for complete search history.

(56) References Cited

U.S. PATENT DOCUMENTS

| | | | |
|---|---|---|---|
| 6,005,364 A | 12/1999 | Acarnley | |
| 6,326,760 B1 | 12/2001 | Cardoletti et al. | |
| 6,653,829 B1 | 11/2003 | Henry et al. | |
| 2006/0125439 A1* | 6/2006 | Ajima et al. | 318/716 |

OTHER PUBLICATIONS

International Preliminary Report on Patentability with Amended Claims, dated Dec. 30, 2005 (9 pages).
International Search Report, mailed Jun. 6, 2005 (2 pages).
Silverio Bolognani et al., "Sensorless Full-Digital PMSM Drive With EKF Estimation of Speed and Rotor Position," IEEE Transactions on Industrial Electronics, vol. 46, No. 1, Feb. 1999, pp. 184-191.

* cited by examiner

*Primary Examiner*—Karen Masih
(74) *Attorney, Agent, or Firm*—Finnegan, Henderson, Farabow, Garrett & Dunner, LLP

(57) ABSTRACT

An electronic device is provided for controlling a motor having three phases driven by a motor driver. In one implementation, the electronic device includes a detection means and a control circuit. The detection means includes three high-gain differential amplifiers and three A/D converters. The detection means detects back EMF voltages induced by the rotation of the motor and applies corresponding signals to the control circuit. The control circuit computes and filters the position and/or the speed of the motor and then delivers the filtered values of the computed rotor position and/or speed to control the motor driver. The motor may thus be controlled even at near-zero rotational speed.

13 Claims, 4 Drawing Sheets

METHOD AND DEVICE FOR CONTROLLING MOTORS

This application is a national stage filing under 35 U.S.C. § 371 of International Application No. PCT/CH2005/000064, filed on Feb. 4, 2005, which claims the benefit of priority to U.S. Provisional Application No. 60/542,349, filed on Feb. 6, 2004.

TECHNICAL FIELD

The present invention generally relates to the control of motors. More particularly, the present invention relates to a method and a device for controlling a synchronous permanent magnet multiphase motor.

BACKGROUND

Synchronous motors with permanent magnets, such as stepping motors, hybrid motors, or direct current motors with no commutating element, are currently well known and used to replace direct current motors with a commutating element, the latter having a relatively short lifetime because of friction generated on the commutating element by carbon brushes.

In motors with permanent magnets, an electronic phase switching circuit is necessary to replace the commutating element function. In synchronous motors, the rotor speed is the same as that of the rotating stator field. When the commutating element is removed and replaced with an electronic circuit, it is necessary to determine the position of the rotor for the control logic to be able to perform the switching at the right time. This is usually achieved with Hall effect probes or optical sensors, which are also called direct sensors.

This type of direct sensors has some drawbacks. First, their costs have a non-negligible impact on the whole cost of the motor. This problem can be partially solved by using a low resolution position sensor as described in U.S. Pat. No. 6,653,829. In this case, however, a state filter must be associated with the sensor to compensate for its low resolution. Secondly, space has to be especially provided not just for the sensors themselves, but also for the related electric connecting means. Therefore, the assembly of such motors is much more complex and time consuming. Finally, the reliability of the system is reduced.

Some existing systems propose to overcome these drawbacks and provide a method and/or a device for controlling a synchronous motor with a permanent magnet with no direct sensors. This is, for example, disclosed in U.S. Pat. No. 6,326,760 or No. 6,005,364, which describe a method and a device to determine the speed of the motor by measuring the induced voltages, in at least two phases, when the driving power in said phases is turned off. However, such a method suffers from the following main drawback. Since the motor with variable load cannot be reliably started by means of a closed loop working in function of the position, this method requires an open-loop starting algorithm for the motor to reach a speed level that is high enough to: 1) create a motion with sufficient kinetic energy to prevent the motor from being stopped by the load between two steps of the control algorithm, and 2) generate induced voltages with a sufficiently high magnitude to allow the rotor position to be determined and thus, the motor to be speed and/or torque controlled.

SUMMARY

Embodiments of the present invention provide a method and an electronic device-for controlling a synchronous motor with permanent magnets that do not suffer from the disadvantages described above. In particular, with the method and device consistent with embodiments of the present invention, it shall be possible to determine the position of the motor even at near-zero speeds. A near-zero speed means that, even when the motor is blocked because, for example, the generated torque is too low, successively turning on and off driving currents will bring about an oscillating movement of the rotor around its rest position and thus produce induced voltages, which are high enough to allow determination of the position of the rotor.

Embodiments of the present invention provide methods to measure induced voltages with a high sensitivity, to determine a position and/or a speed of the rotor from the measured induced voltages, and then to use the determined position and/or speed of the rotor to control the power of each phase of the motor. Methods consistent with the present invention may be used for any synchronous motor, be it a two-phase or multiple-phase, unipolar or bipolar motor, and controlled with or without pulse-width modulation.

Embodiments of the present invention also relate to a method for controlling a synchronous permanent magnet multiple-phase motor, where the motor has multiple phases and has a rotor. The method includes controlling drive currents supplied to the phases of the motor phase by turning the drive currents off a predetermined frequency; measuring, at said predetermined frequency, induced voltages of at least two of the phases of the motor, when the drive currents in said at least two of the-phases are turned off, with a sensitivity sufficient for obtaining significant voltage values at a near-zero speed of the rotor; determining a position and/or a speed of the rotor from said measured induced voltages; filtering the position and/or the speed of the rotor with a state filter to obtain a filtered rotor position and/or a filtered rotor speed; and adjusting the drive currents according to the filtered rotor position and/or filtered rotor speed.

Consistent with embodiments of the present invention, an electronic device for controlling a synchronous permanent magnet motor with at least one phase, a coil, a rotor, and a motor driver includes detection means connected to the at least one phase of the motor for generating signals that represent induced voltages of the at least one phase of the motor, said detection means having such a gain that the signals representing the induced voltages are significant even if a speed of the rotor is near-zero, and a control circuit connected to said detection means and to the motor driver for supplying driving currents to the motor, said control circuit comprising means for generating signals representing a position and/or a speed of the rotor from the signals representing the induced voltages.

BRIEF DESCRIPTION OF THE DRAWINGS

Embodiments of the invention are described in greater detail hereinafter relative to the attached schematic drawings.

DESCRIPTION OF EMBODIMENTS

Figure 1:
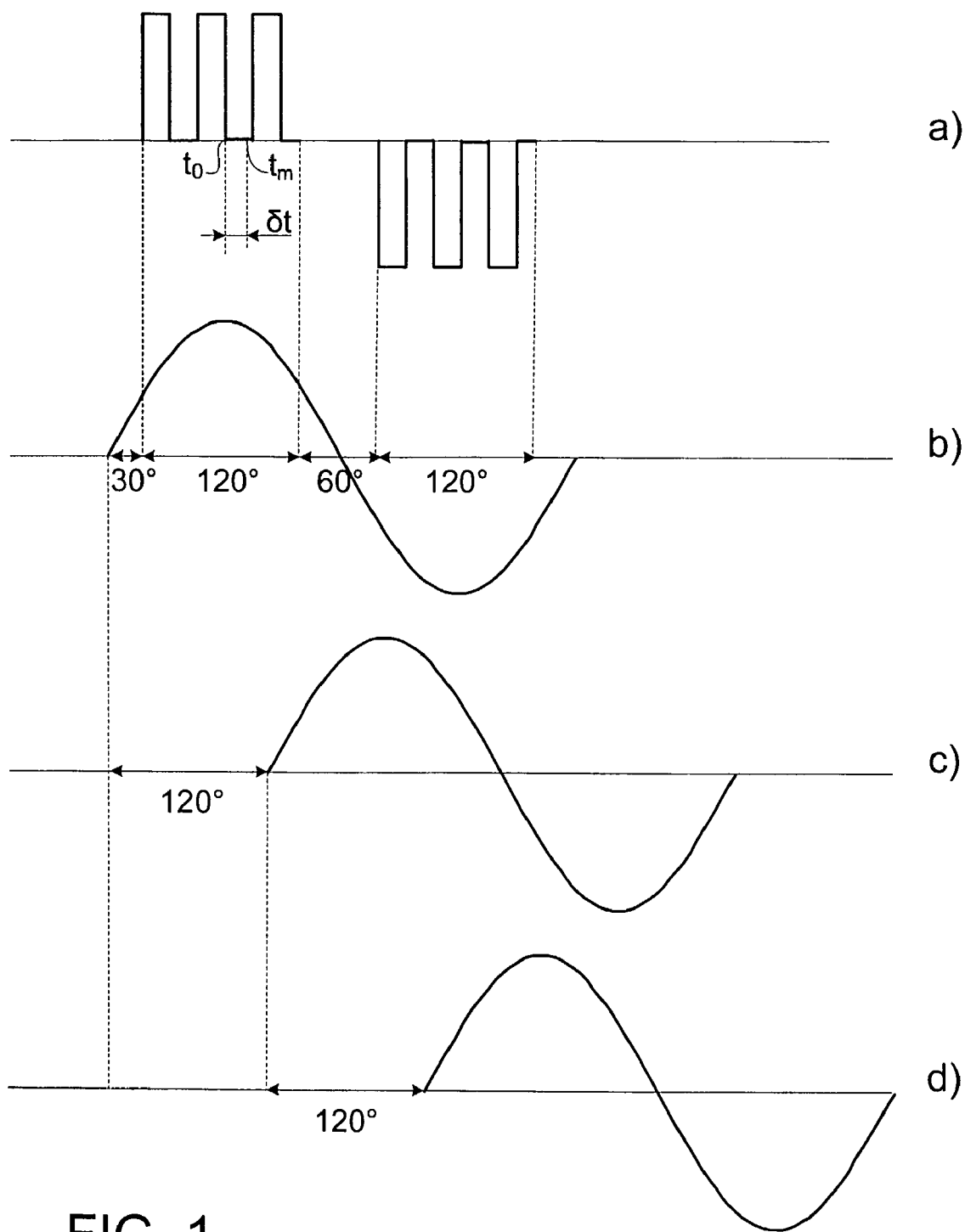
FIG. 1 shows an example of drive currents which can be used to control a synchronous three-phase motor as well as the induced voltage generated in each of three phases of the motor.

Curve a) in FIG. 1 shows an example of a drive current that can be used to control one phase of a synchronous three-phase motor. Curves b), c), and d) in FIG. 1 show the induced voltages that can be measured in each respective phase when the motor is rotating and the drive currents are turned off. The induced voltage shown in curve b) of FIG. 1 corresponds to the drive current shown in curve a) of FIG. 1. The drive currents corresponding to curves c) and d) are not shown. There exists a phase shift from one motor phase to another between the corresponding drive currents, as well as between the respective induced voltages. For a three-phase synchronous motor, this phase shift is equal to 120°. In the example shown in FIG. 1, the drive current pulses have a positive value when the induced voltage is positive and a negative value when the latter is negative. This is valid for a positive torque only and, when a negative torque is required, drive current pulses polarities are reversed. Besides, drive current pulses are present for a fraction of each half-period of the induced voltage waveform only. According to FIG. 1, this fraction is equal to 120°, starting at 30° after the zero-crossing of curve b), and is followed by a time period during which the drive current is turned off. This turned-off period corresponds to a motor rotation angle of 60°. The frequency of the drive current pulses is chosen as a function of both the characteristics of the motor and its current status. After the drive current is turned off, for instance at time $t_0$, there is a stabilization period δt after which the induced voltage in each motor phase is measured, for instance at time $t_m$. From these measured induced voltages, the rotor position and rotor speed can be determined. By way of example, the rotor position in a two-axis system can be determined from the induced voltages measured in a three-phase synchronous motor using the following formulae:

$$Ua = V1,$$
$$Ub = \frac{V2 - V3}{\sqrt{3}},$$

where Ua and Ub are two voltages proportional to the two components of the rotor position vector in said two-axis system (i.e., $\sqrt{Ua^2+Ub^2}$ is proportional to the rotor speed) and V1, V2, and V3 are the measured induced voltages in the three motor phases, respectively. The rotor rotational speed may be advantageously determined by computing the square root of the sum of squares of all measured induced voltages V1 to V3. It should be noted however that two measured induced voltages only are actually required since the third one can be determined using the equation V1+V2+V3=0. Other methods, well known to those skilled in the art, may also be used, such as derivation of the determined position or calculation of the change in rotor position as a function of time.

Figure 2A:
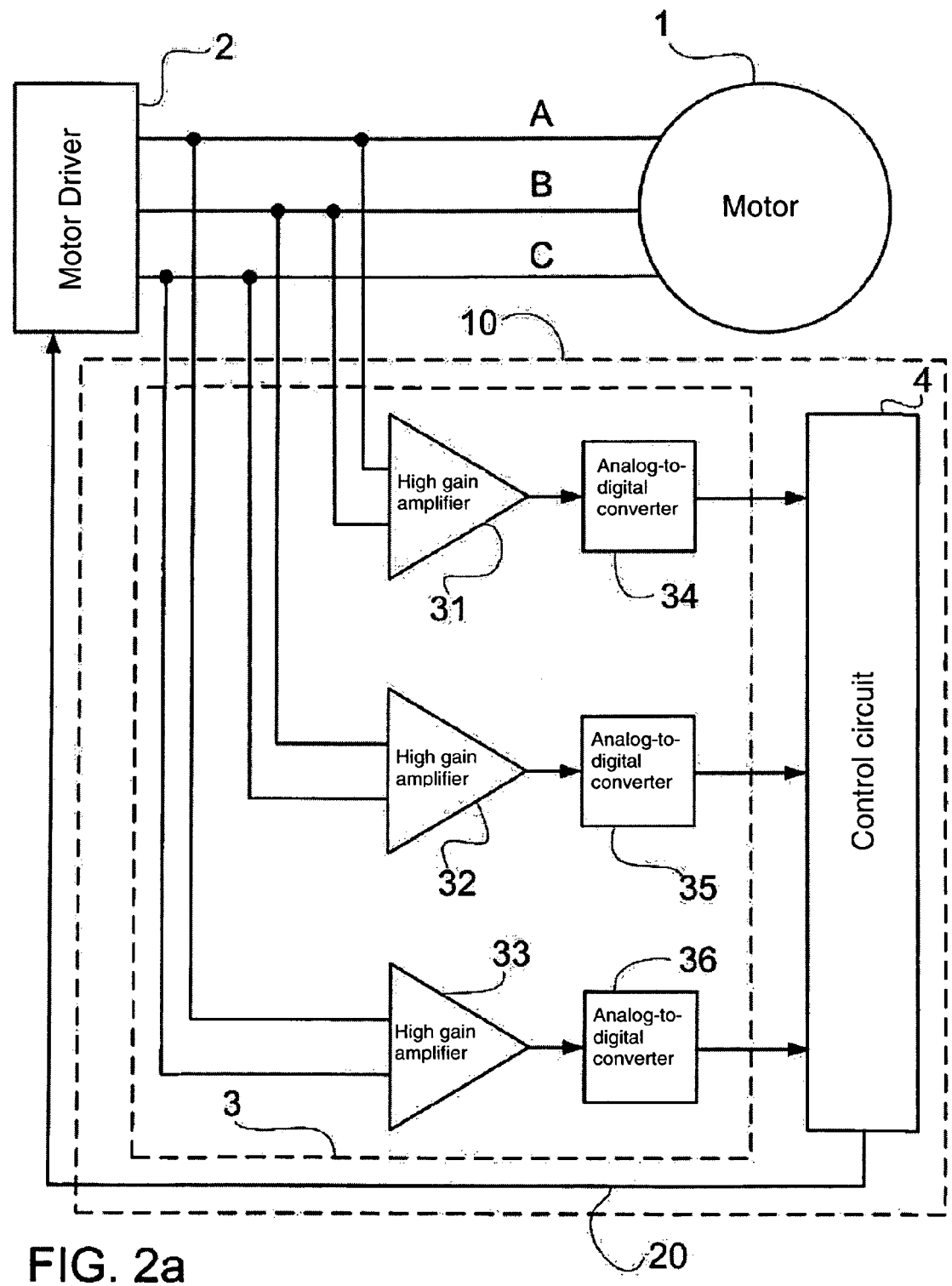
FIGS. 2a-2c show different arrangements of a device consistent with embodiments of the invention for controlling a synchronous three-phase motor with permanent magnets.
Figure 2B:
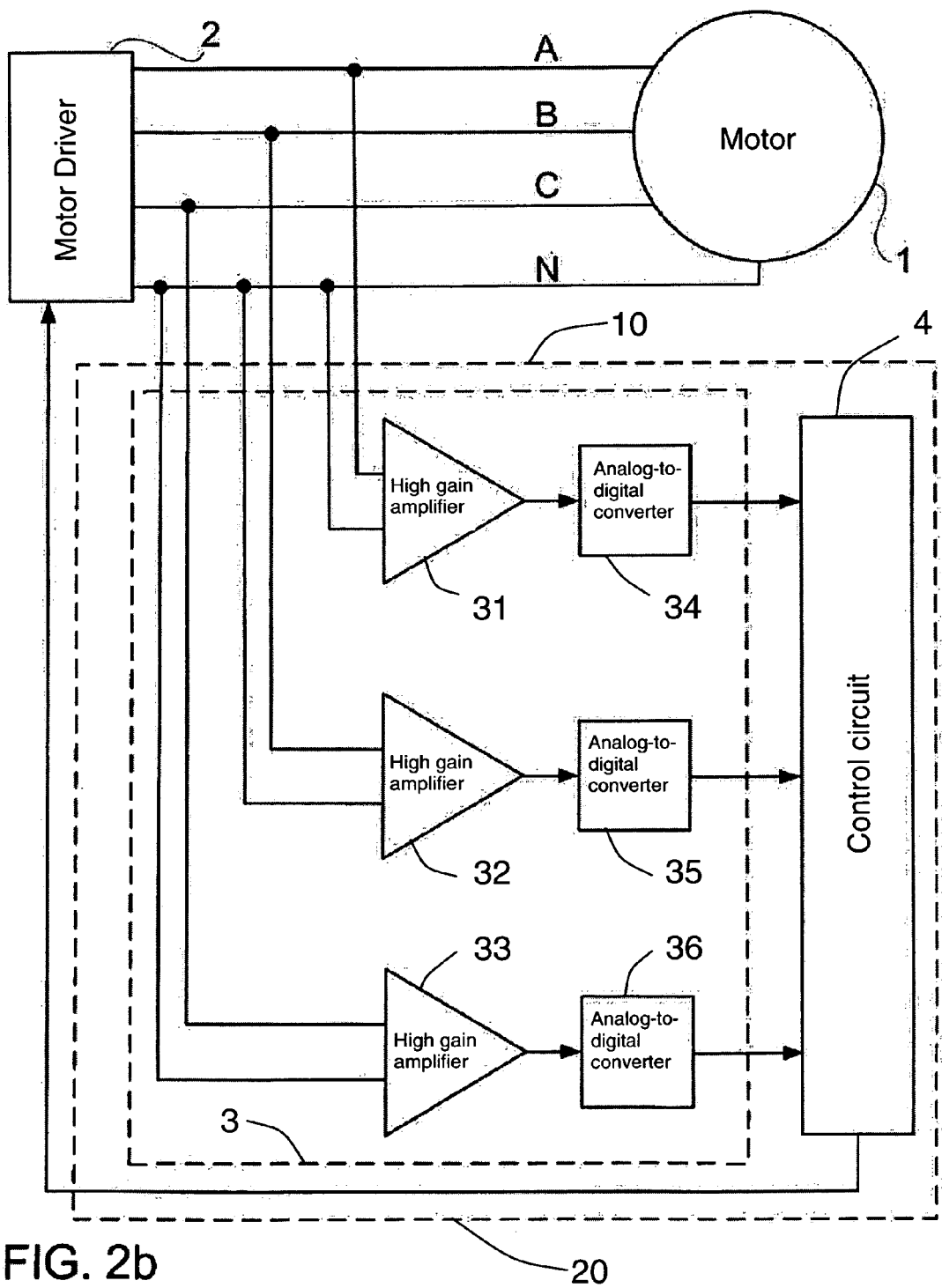
Figure 2C:
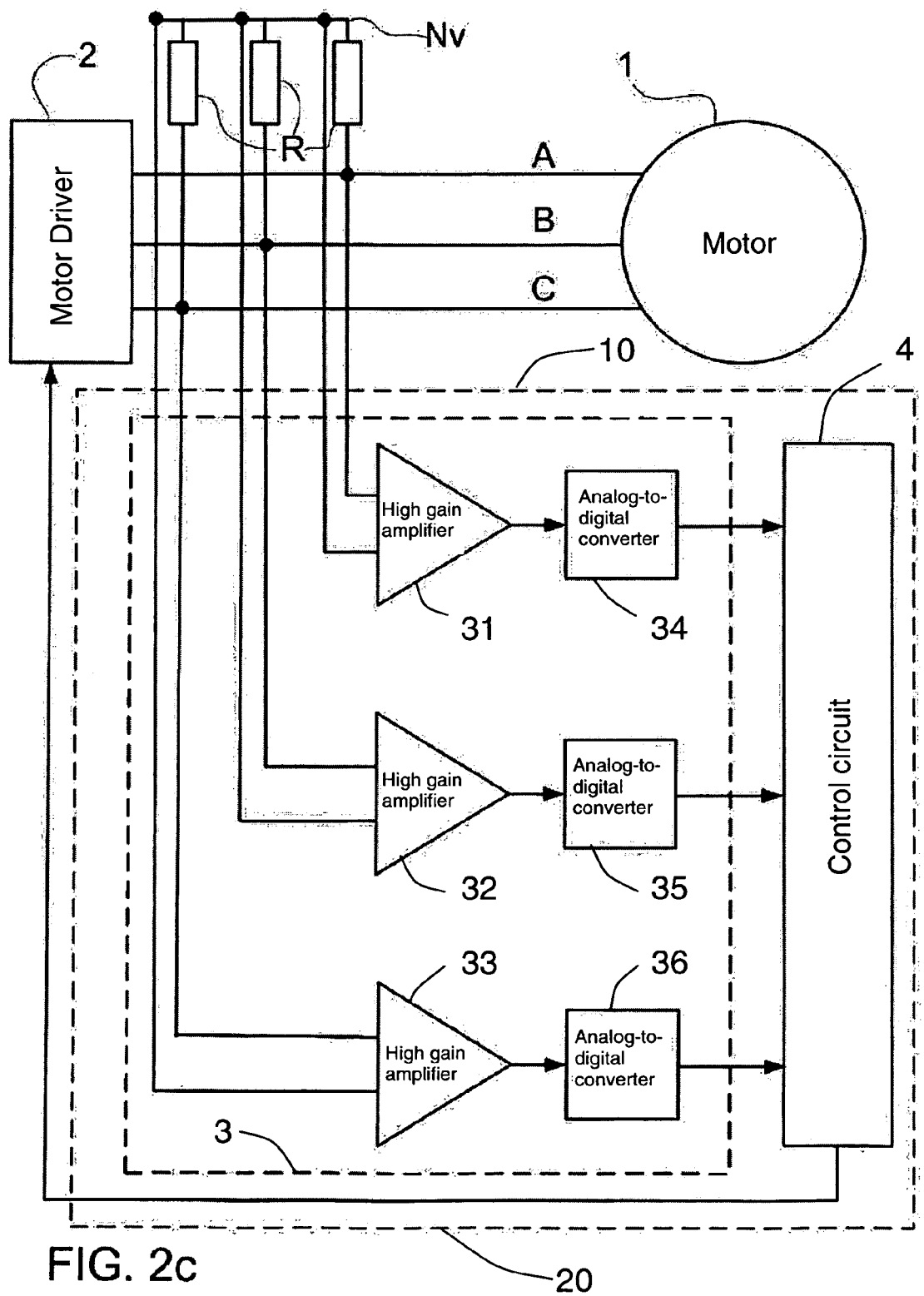

The arrangements shown in FIGS. 2a to 2c represent different options to connect a device 10 consistent with embodiments of the present invention to a synchronous motor 1 depending on whether a neutral node N (FIG. 2b) is available or not. However, such a neutral node may be virtual, as shown in FIG. 2c. In this latter case, a virtual neutral node Nv is derived from an array of three resistors R, which are connected between respective phases A, B and C of the motor and said virtual neutral node.

Referring now to FIG. 2a, synchronous motor 1 has three phases driven by a motor driver 2. The device consistent with embodiments of the invention, with the reference number 10, will be referred to as electronic means hereafter. Electronic means 10 comprises a detection means 3 and a control circuit 4. The detection means 3 comprises three high-gain differential amplifiers 31 to 33 and three analog-to-digital converters 34 to 36. Each of differential amplifiers 31 to 33 has two differential inputs each connected to one phase of the motor 1 so as to be able to measure the voltage difference between corresponding motor phases. In one aspect, the gains of differential amplifiers 31 to 33 are high enough to detect the small induced voltages that are generated by the motor 1 when its rotational speed is near-zero.

The analog output signals of differential amplifiers 31 to 33 are converted into digital signals by A/D converters 34 to 36 before being applied to control circuit 4. Advantageously, control circuit 4 may include a microprocessor, a DSP or a FPGA. The position and/or speed of the rotor are computed by control circuit 4 from digital signals outputted by A/D converters 34 to 36. Such computed rotor position and speed will be referred to hereafter as measured rotor position and speed, respectively.

As previously mentioned, the rotational speed of the rotor may be determined by computing the square root of the sum of squares of the back EMF voltages existing on the motor phases when the driving currents thereof are turned off. This method of determining the rotational speed of the rotor is better than other known methods because it gives an instantaneous result.

For the determination of the motor position, the components Ua and Ub, representative of the position vector in a two-axis system, are computed by the control circuit from the back EMF voltages V1 to V3 using the formulae given here above. Then, the measured angular position θ of the rotor may be computed by using the following formula:

$$\theta = arctg\ (Ua/Ub).$$

Consistent with embodiments of the present invention, control circuit 4 also comprises a state filter (not shown), to which are applied the measured rotor position and/or the measured rotor speed and which delivers a filtered rotor position and/or a filtered rotor speed. With such a state filter, which may consist in a Kalman filter, it is possible to filter out noise and/or disturbances that are always present in actual dynamic systems. Generally speaking, the state filter, or Kalman filter, processes all available measurements, regardless of their precision, to estimate the current value of the variables of interest, with use of any available information about initial conditions of the variables of interest. In the present case, the measured rotor position and/or the measured rotor speed may be corrupted by system noises or other disturbances, especially when the rotor rotational speed is low. A Kalman filter, or any equivalent coherence filter, takes into account the physical knowledge that, when the rotational speed of the rotor is very low, the position of the rotor can not change substantially over a short period of time. In other words, when the speed is very low, the rotor position may be assumed to remain constant. Unlike the measured data, such as measured rotor speed and position, the filtered data are thus coherent information that can be used to control the motor properly.

By way of example for the position of the motor, the Kalman filter may be implemented using the following coherence algorithm:

$$X = X_{-1} + (a*V*T + b*dP) \div 2,$$

where
X is the estimated position at time t,
$X_{-1}$ is the estimated position at time $t_{-1}$,
V is the measured speed using back EMF voltages at time $t_m$,
T is the time duration between 2 successive measurements $t_1$ and t,
dP is the difference between Xm and $X_{-1}$, where Xm is the measured position using back EMF voltages at time $t_m$ with $t_{-1} \leq tm \leq t$, and the difference dP is limited to $\pm(c*VT+d)$, and parameters a, b, c, and d are coefficients that are adapted to adjust the algorithm to the characteristics of the motor.

Filtered rotor position and/or rotor speed delivered by the Kalman filter are applied to the motor driver 2 via a connection 20 to possibly adjust the drive currents sent to the motor 1.

The coherence algorithm described above is only one of numerous examples consistent with the principles of the present invention. Besides, it shall be understood that the state filter designation will encompass any other filtering circuit that substantially achieves the same function as that described above in relation to the state filter.

The present invention is not limited to the embodiments described above. Variations and improvements may be made, without departing from the scope of protection of the present patent. More particularly, although the invention has been described with reference to a synchronous rotating motor with permanent magnets and three phases, it will be understood that the method and device consistent with the present invention may also be applied in multiphase rotating motors as well as to synchronous linear motors.

The invention claimed is:

1. A method for controlling a synchronous permanent magnet multiple-phase motor, the motor having multiple phases and having a rotor, the method comprising:
   controlling drive currents supplied to the phases of the motor by turning the drive currents off at a predetermined frequency;
   measuring, at said predetermined frequency, induced voltages of at least two of the phases of the motor, when the drive currents in said at least two of the phases of the motor are turned off, with a sensitivity sufficient for obtaining significant voltage values at a near-zero speed of the rotor;
   determining a position and/or a speed of the rotor from said measured induced voltages;
   filtering the position and/or the speed of the rotor with a state filter to obtain a filtered rotor position and/or a filtered rotor speed; and
   adjusting the drive currents according to the filtered rotor position and/or the filtered rotor speed.

2. The method according to claim 1, wherein the state filter is configured so as to take into account that when the speed of the rotor is very low, the position of the rotor does not change substantially over a short period of time.

3. The method according to claim 2, wherein said state filter is a Kalman filter.

4. The method according to any of claims 1 to 3, wherein the position, θ, of the rotor is determined by the formula:

$$\theta = \text{arctg}\left(\frac{Ua}{Ub}\right),$$

where Ua is the measured induced voltage in one of the phases of the motor and Ub is equal to $$\frac{V2-V3}{\sqrt{3}},$$

V2 and V3 being the measured induced voltages in two others of the phases of the motor.

5. The method according to claim 1, wherein the speed of the rotor is determined by computing a square root of a sum of squares of the measured induced voltages.

6. The method according to claim 2, wherein the state filter implements an algorithm:

$$X = X_{-1} + (a*V*T + b*dP) \div 2,$$

where X is an estimated position of the rotor at time t,
$X_{-1}$ is an estimated position of the rotor at time $t_{-1}$,
V is a measured speed of the rotor using back EMF voltages at time $t_m$,
T is a time duration between $t_{-1}$ and t,
dP is the difference between Xm and $X_{-1}$, wherein Xm is a measured position of the rotor using back EMF voltages at time $t_m$ with $t_{-1} \leq tm \leq t$, and the difference dP is limited to $\pm(c*VT+d)$, and
a, b, c and d are coefficients which depend on characteristics of the motor.

7. The method according to claim 4, wherein the speed of the rotor is determined by computing a square root of a sum of squares of the measured induced voltages.

8. The method according to claim 4, wherein the state filter implements an algorithm:

$$X = X_{-1} + (a*V*T + b*dP) \div 2,$$

where X is an estimated position of the rotor at time t,
$X_{-1}$ is an estimated position of the rotor at time $t_{-1}$,
V is a measured speed of the rotor using back EMF voltages at time $t_m$,
T is a time duration between $t_{-1}$ and t,
dP is the difference between Xm and $X_{-1}$, wherein Xm is a measured position of the rotor using back EMF voltages at time $t_m$ with $t_{-1} \leq tm \leq t$, and the difference dP is limited to $\pm(c*VT+d)$, and
a, b, c and d are coefficients which depend on characteristics of the motor.

9. The method according to claim 5, wherein the state filter implements an algorithm:

$$X = X_{-1} + (a*V*T + b*dP) \div 2,$$

where X is an estimated position of the rotor at time t,
$X_{-1}$ is an estimated position of the rotor at time $t_{-1}$,
V is a measured speed of the rotor using back EMF voltages at time $t_m$,
T is a time duration between $t_{-1}$ and t,
dP is the difference between Xm and $X_{-1}$, wherein Xm is a measured position of the rotor using back EMF voltages at time $t_m$ with $t_{-1} \leq tm \leq t$, and the difference dP is limited to $\pm(c*VT+d)$, and
a, b, c and d are coefficients which depend on characteristics of the motor.

10. An electronic device for controlling a synchronous permanent magnet motor with at least one phase, a coil, a rotor, and a motor driver, the electronic device comprising:
   detection means connected to the at least one phase of the motor for generating signals that represent induced voltages of the at least one phase of the motor, said detection means having a gain such that the signals representing the induced voltages are significant even if a speed of the rotor is near-zero; and a control circuit connected to said detection means and to the motor driver for supplying driving currents to the motor, said control circuit comprising means for generating signals representing a position and/or a speed of the rotor from the signals representing the induced voltages.

11. The electronic device according to claim 10, wherein the motor includes at least two phases, and wherein said detection means comprises, for each of the at least two phases:

a differential amplifier having inputs connected to two of the at least two phases of the motor; and an analog-to-digital converter for converting an analog signal outputted by said differential amplifier into a digital signal and providing said digital signal to said control circuit.

12. The electronic device according to claim 10 or claim 11, wherein the control circuit further comprises a state filter for filtering the signals representing the position and/or the speed of the rotor.

13. The electronic device according to claim 12, wherein said state filter is a Kalman filter.

* * * * *